United States Patent [19]

Seidel et al.

[11] Patent Number: 4,476,600
[45] Date of Patent: Oct. 16, 1984

[54] ONE-PIECE, WASHABLE AND STERILIZABLE PLASTIC SHOE

[75] Inventors: Hartmut Seidel, Hamburg; Winrich B. Hammerschmidt, Schenefeld, both of Fed. Rep. of Germany

[73] Assignee: NATEC Institut, Hamburg, Fed. Rep. of Germany

[21] Appl. No.: 354,226

[22] Filed: Mar. 3, 1982

Related U.S. Application Data

[62] Division of Ser. No. 171,666, Jul. 24, 1980, Pat. No. 4,408,401.

[30] Foreign Application Priority Data

Jul. 28, 1979 [DE] Fed. Rep. of Germany ....... 2930807

[51] Int. Cl.$^3$ ............... A43B 7/08; A43B 7/06; B29F 1/00
[52] U.S. Cl. ................ 12/142 V; 12/142 R; 36/3 B; 36/87; 264/244
[58] Field of Search .......... 12/142 R, 142 V, 51, 12/17 R; 36/3 R, 3 B, 3 A, 87; 264/244

[56] References Cited

U.S. PATENT DOCUMENTS

| | | | |
|---|---|---|---|
| 2,239,377 | 4/1941 | Altvater | 12/142 V |
| 2,398,623 | 4/1946 | Daniels | 12/142 V |
| 4,032,611 | 6/1977 | Fukuoka | 264/244 |
| 4,078,321 | 3/1978 | Famolare, Jr. | 36/3 B |
| 4,100,685 | 7/1978 | Dassler | 36/3 B |
| 4,237,628 | 12/1980 | Etancelin | 36/7.2 |
| 4,408,401 | 10/1983 | Seidel | 36/3 B |

FOREIGN PATENT DOCUMENTS

2238811 2/1974 Fed. Rep. of Germany.

OTHER PUBLICATIONS

Shurr Schuhrertrieb GmbH, Schwarzenbach/Saale & Anton Schur, Chem. Pharm. Fabrik, Nettetal 1, *Endlich Keimfrei*, Undated.

*Primary Examiner*—Werner H. Schroeder
*Assistant Examiner*—Steven N. Meyers
*Attorney, Agent, or Firm*—Roylance, Abrams, Berdo and Goodman

[57] ABSTRACT

A one-piece, washable and sterilizable plastic shoe comprising a lower part with a top on which the foot bears and a bottom enveloping an outsole and a heel, and an upper part having ventilating openings in a substantially vertical lateral area, these openings having upper and lower outer boundary edges that are lower, respectively, than the corresponding upper and lower inner boundary edges thereof. The method for producing such a plastic shoe includes the steps of introducing mouldable plastic into a mould comprising top and bottom halves with a shoe last therebetween and simultaneously forming the lateral ventilating openings by means of spaced pins extending between the bottom-half mould and the last. The apparatus for producing the shoe comprises a mould having top and bottom halves with a shoe last therebetween and a plurality of pins extending from the bottom-half mould into removeable engagement with the shoe last. The pins are shaped and oriented to provide the desired configuration to the ventilating openings.

9 Claims, 8 Drawing Figures

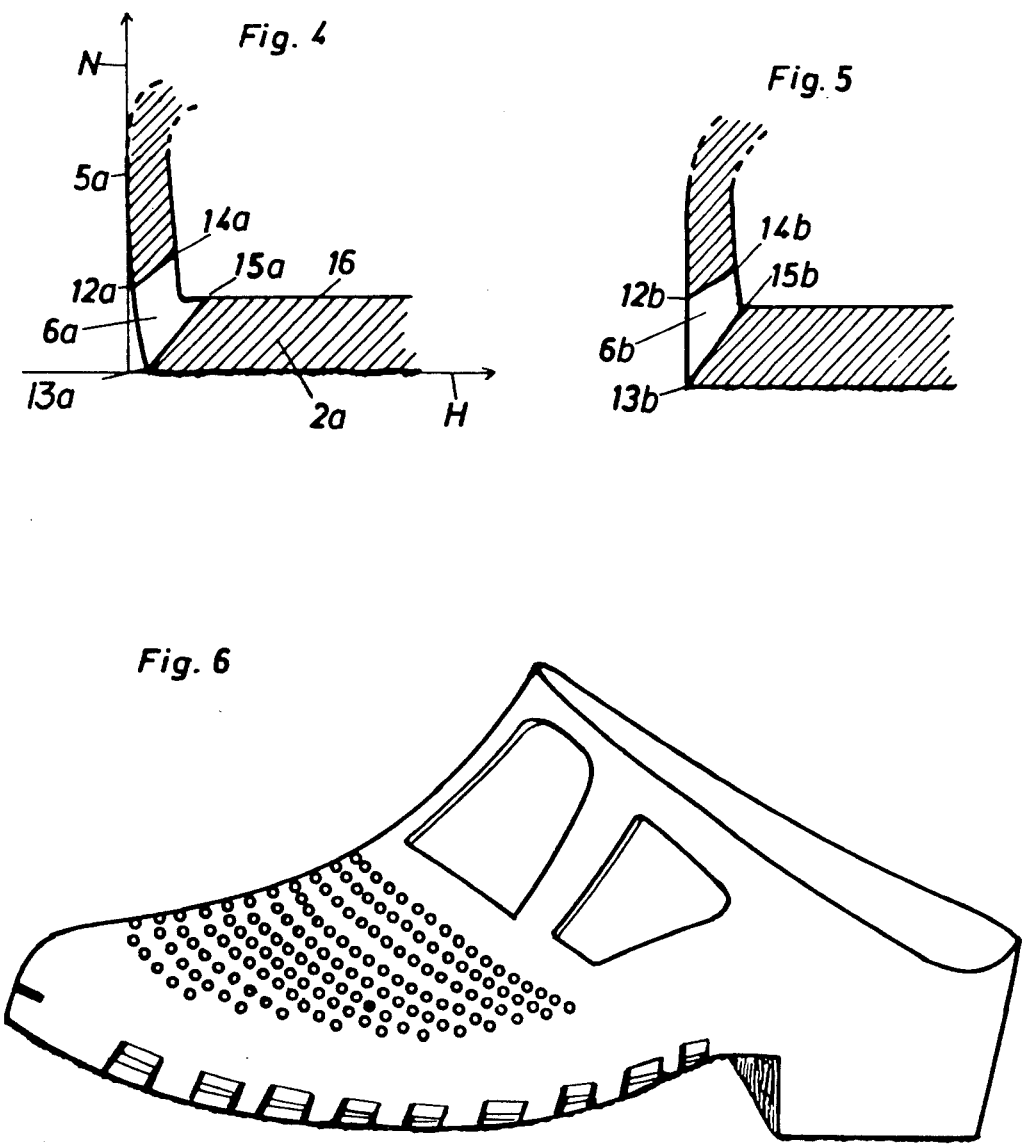

ONE-PIECE, WASHABLE AND STERILIZABLE PLASTIC SHOE

This application is a division of application Ser. No. 171,666, filed July 24, 1980, now U.S. Pat. No. 4,408,401.

The present invention relates to a one-piece, washable and sterilizable plastic shoe made from a robust, elastic plastic material provided with characteristically shaped and arranged ventilating openings, as well as to a method and to an apparatus for producing such a shoe.

Shoes made using plastic have long been known, whereby some are made entirely from plastic, whilst others only have certain parts, e.g. the upper or lower parts, front cap or sole made from plastic. Such shoes are more particularly used for special purposes, for example as beach, bathing and sports shoes and the like, but also are available as standard working or walking shoes.

These known, wholly or partly plastic shoes are generally only manufacturable by means of relatively complicated processes and are therefore relatively expensive. However, the wearing characteristics of such shoes are also not always satisfactory, particularly with regard to the requirements for a firm, but still comfortable fit, the slipping or sliding resistance, the pliability and elasticity as well as in particular the completely satisfactory ventilation of the shoe.

Numerous attempts have been made to obviate these and other disadvantages of plastic shoes.

Thus, e.g. West German Offenlegungsschrift No. 2,238,811 describes a complete foam moulded shoe with an instep in which the sole and upper are produced completely mechanically and separately by a foam moulding process using polystyrene or polypropylene or plastic combinations. Both parts must subsequently be durably joined together in some suitable way.

Although this shoe is much lighter than similarly shaped conventional shoes, it has considerable deficiencies both as regards the manufacture and use. Manufacture is relatively complicated, because it is necessary to separately produce the upper and lower parts of the shoe, after which they are joined together and finally must be provided with ventilating openings so that the shoe is provided with a certain ventilation. Further operations involve the fitting of the outsole and the heel and, in order to improve the wearing characteristics, a cushion or pad on the inside of the upper. However, despite the ventilating openings, the shoe is too hot when worn and in addition its elasticity when walking is inadequate.

In addition, a washable and disinfectable shoe is known which is mainly intended for use in hospitals. It comprises a clog-like shoe body in which the upper and lower parts are combined. This shoe body is made from polyurethane with ventilating openings in the side portions thereof. A profiled, slip-proof outsole and a correspondingly finished heel are fixed to the bottom of the shoe body. The shoe body can only be used by inserting an instep raiser, which is made from polyurethane and conductively connected with an antistatic device of the shoe body by means of a metal gauze placed in a rectangular recess in the centre of the sole. Thus, the complete shoe comprises at least three to four joined parts (sole, heel, shoe body and instep raiser) and has very complicated antistatic means. Therefore, the labour costs involved in its manufacture are high, making the shoe correspondingly expensive.

Shoes made wholly or partly from plastic materials generally have the disadvantage that when worn unpleasant localizations of heat can form on the feet due to the thermal insulation of plastics leading to the known unpleasant consequences.

Attempts have therefore been made to obviate this problem by providing known plastic shoes laterally or at the top with ventilating openings having different configurations and sizes. However, the hitherto known solutions have only been partly satisfactory, because despite the ventilating openings, the localizations of heat are frequently not removed to the necessary extent or, if there are too many perforations in the upper part of the shoe, although the ventilation is adequate, the strength and durability of said shoe upper part are inadequate. In addition, the provision of the plastic shoe with ventilating openings generally requires additional operations which often have to be carried out manually instead of mechanically, which leads to a not inconsiderable increase in the cost of the products.

The problem of the present invention is to provide a shoe which is entirely made from a suitable elastic plastic material, which can be easily mass produced in a few process stages, i.e. with minimum expenditure and which, even in the case of prolonged use, is characterized by pleasant wearing characteristics, including a completely satisfactory ventilation of the foot. The shoe is washable and sterilizable and even after being treated in this way a number of time has substantially no undesired changes, such as deformations, material damage, etc.

According to the invention, this problem is solved by a one-piece, washable and sterilizable plastic shoe made from an elastic and robust and preferably expanded plastic material, comprising a lower part with a top on which bears the foot and a bottom enveloping an outsole and a heel which is optionally offset therefrom, as well as an upper part extending onto the lower part, forming a cavity for receiving the toes, ball and metatarsus and having ventilating openings, characterized in that ventilating openings are provided in the substantially vertical lateral area of the upper part of the shoe spaced from one another over the outsole edge and the outer boundary edges thereof are lower than the corresponding inner boundary edges.

The shoe according to the invention is preferably made from expanded polyurethane. This material has numerous advantageous characteristics for the usability of a shoe, such as excellent strength and elasticity, good deformability, almost complete indestructibility and good thermal insulation. Polyurethane also has the advantage that shoes made from this material can be easily washed and sterilized numerous times, without any risk of the shoes losing their shape, shrinking, cracking, becoming brittle or suffering any other type of material damage as a result of this treatment. The shoes according to the invention can therefore be used with particular advantage where high demands are made on hygiene, e.g. in hospitals, food processing plants such as dairies, breweries, abattoirs, as well as in industrial kitchens, factories producing pharmaceutical products, microbiological laboratories, etc.

The shoe according to the invention offers an effective, but simple solution of the aforementioned ventilation problems.

According to the invention, the ventilating openings are arranged in such a way that they ensure an optimum ventilation of the shoe, without significantly impairing the strength and durability thereof.

The formation and configuration of the ventilating openings according to the invention also have the advantage that the already good elasticity of the shoe is further increased and therefore despite the large number of ventilating openings provided, the protective function of the shoe is not significantly reduced due to its characteristic construction, apart from the fact that it is not water-tight, which is naturally the case with all shoes having a perforated surface.

The shoes according to the invention also have the great advantage that they can be manufactured in one operation and in one piece by moulding or injection moulding of the plastic material which is in the fluid state in a closed mould comprising a last, a bottom-half mould and a top-half mould and including the ventilating openings which, according to the invention, are formed in such a way that they do not impede the movements connected with the closing and opening of the upper and lower mould halves after moulding or injection moulding and also cause no damage or premature wear to the moulds. Thus, apart from the subsequent processing which is to a greater or lesser extent necessary with all molded articles, no further time-consuming and labour-intensive processing stages are necessary, which provides a considerable cost saving compared with similar known products.

An optimum frictionless removal of the shoe from the mould or injection mould, particularly from the bottom-half mould is possible without difficulty according to the invention even with the pins in the latter, said pins forming ventilating openings shaped and arranged in accordance with the invention. It is obvious that mould removal without impairing or even destroying the shoe is not possible if during removal, the pins are moved in a direction which is at right angles or approximately at right angles to the longitudinal axis of the pins. To permit the pins to be removed without difficulty from the shoe, following moulding or injection moulding and hardening of the shoe, they must be arranged and shaped in a unique way so that they can form the desired ventilating openings. This means that the connecting sides of the ventilating openings between the outer and the corresponding inner boundary edges, and consequently also the corresponding side walls of the pins, must form an angle $\alpha$ below 90° with the normal line of the shoe which is perpendicular on the horizontal opening plane of the mould. It has been found that mould removal can be carried out particularly easily and smoothly if the connecting sides of the ventilating openings between the outer boundary edges and the corresponding boundary edges form and angle $\alpha$ between 0° and 30°, preferably between 5° and 15° with the shoe normal line perpendicular to the horizontal opening plane of the mould.

The ventilating openings provided in spaced manner in the vertical lateral area of the upper part of the shoe over the edge of the sole can have various configurations. For example, the outer edges bounding the ventilating openings can assume different positions relative to one another. According to an appropriate embodiment, the upper and lower outer boundary edges of a ventilating opening are in a plane at right angles to the horizontal. According to a further preferred embodiment, the upper outer boundary edge is located further to the outside than the lower outer boundary edge, so that for the same good ventilating action, the protective action of the upper part, particularly against liquid striking from above, is increased.

The inner boundary edges of the ventilating openings are in or approximately in a plane at right angles to the horizontal in the case of substantially vertically directed side wall of the shoe. It has been found that a particularly advantageous ventilating action can be obtained if the lower inner boundary edge, relative to a plane which is at right angles to the horizontal, is positioned further inwards than the upper inner boundary edge. As a result, the edge of the top of the foot support is cut somewhat in the vicinity of the ventilating openings which provides a better ventilation guidance, without the function of the foot support being impaired.

According to another advantageous embodiment of the inventive shoe, the ventilating openings in the indicated lateral area are provided all-round the front upper part of the shoe in at least one row, starting in the vicinity of the heel on one side and ending in the vicinity of the heel on the other side, it being optionally possible to interrupt the row in the front shoe cap area.

To facilitate removal from the mould, it is also advantageous to shape the ventilating openings in such a way that they taper conically from the outside to the inside.

The ventilating openings provided in accordance with the invention can be in the most varied forms in accordance with requirements and fashion. Advantageously, configurations are rectangular, square, circular or oval ventilating openings.

According to a further advantageous development of the shoe according to the invention, additional ventilating openings are provided in the substantially horizontal area of the front upper part of the shoe. Although the ventilating openings provided according to the invention in the area of the sole edge and the upper part directly adjacent thereto in themselves ensure a good ventilation due to their favourable positioning with respect to the foot in the shoe, provided that they are present in adequate numbers and size, it may in some cases be desirable to assist this ventilation by additional ventilating openings on the substantially horizontal upper part of the shoe. However, the diameter of these additional openings must not exceed a certain value. It has been found that an additional ventilation of the shoe without significantly impairing the protective function of the upper part is ensured if the additional ventilating openings have a maximum diameter of 3 mm.

The additional ventilating openings can be given the most varied shapes, e.g. square or circular and can be provided on the front upper part of the shoe in the most varied regular or irregular arrangements, so that e.g. when regularly arranged, patterns are obtained which at the same time give the shoe a particularly attractive appearance.

Obviously, the shoe according to the invention can be provided with further useful characteristics and features. Thus, the shoe can be given an antistatic finish or can be suitably coloured by adding suitably acting agents to the plastic, preferably the polyurethane prior to moulding or injection moulding. In addition, the sole and heel areas of the shoe are appropriately produced in such a way that they are slip-proof. In the most simple manner, this can be brought about by the outsole and heel surfaces having a slip-proof, profile-like surface area.

The shape and construction of the shoe according to the invention can easily be modified without passing beyond the inventive principle. For example, the outer surfaces of the shoe can be subject to any desired and technically possible development. Thus, the outer surfaces of the upper part and heel can be made smooth or provided with a pattern, e.g. they can be grained, provided with a wood grain-like pattern, etc. Obviously, the shoe according to the invention can be manufactured in any desired size and, if desired, can be given any random colouring.

The invention also relates to a method for producing a one-piece, washable and sterilizable plastic shoe by moulding or injection moulding. The method according to the invention is characterized in that an adequate quantity of a mouldable or injection mouldable, optionally foamable plastic material is introduced in a fluid state and at an appropriate temperature into an optionally heatable and/or coolable mould or injection mould comprising the top-half mould and a bottom-half mould and a correspondingly adapted last and the shoe is moulded in one piece, the lateral ventilating openings on the shoe being shaped in the last during the moulding process by suitably shaped and arranged pins in the bottom-half mould and optionally corresponding recesses in which the pins can engage, the introduced plastic material optionally being left in the mould for an adequate time for complete foaming to take place and for the foaming to harden, whereby after the plastic material has hardened the mould is opened and the plastic shoe is removed therefrom.

The plastic material used is optionally a foamable or expandable polyurethane, the isocyanate component and the dihydroxy or polyhydroxy component, optionally together with foaming agents and other conventional additives being intensely mixed together in a suitable mixer just prior to the moulding or injection moulding of the shoe.

The isocyanate component can be known, commercially available, moderately viscous prepolymers which are liquid at room temperature or slightly elevated temperatures. They are prepared by per se known methods by polyesters or polyethers with excessive quantities of diisocyanate. The dihydroxy or polyhydroxy component mainly comprises glycols and essentially serves as a chain extender for producing polyurethane s with the desired elastomeric characteristics. The polyurethane is preferably used in expanded form, 0.1% to 0.4% by water, based on the isocyanate-free component quantity is added as the foaming agent to said component.

If desired, the foaming agent can also be constituted by inert, low-boiling liquids such as trichlorofluoromethane, optionally combined with a small amount of water.

The moulding or injection moulding of the shoe appropriately takes place at a temperature at which the plastic material used is fluid, preferably in the range approximately 10° to 60° C.

The method can be performed in per se known moulds for producing one-piece plastic shoes suitable for moulding or injection moulding fluid plastic material. Such moulds generally comprise the bottom-half mould, the top-half mould and correspondingly adapted last, whereby said members are normally movable relative to one another and generally the top-half mould and last are raised from the bottom-half mould and can be moved about a horizontal axis. Advantageously, a pair of shoes is simultaneously produced in paired moulds. Twelve to twenty-four such paired moulds are normally arranged in a circle or so-called carousel. However, the method can also be performed by other known mould configurations.

The moulded or injection moulded shoe provided with the lateral ventilating openings is advantageously removed from the mould in such a way that initially the top-half mould is moved by a large distance therefore and the last by a smaller distance in the upwards direction about a horizontal axis. The shoe is drawn out of the bottom-half mould with the pins for forming the lateral ventilating openings and is detached from the top-half mould. The shoe is then removed from the last.

The invention also relates to an apparatus for producing a one-piece, washable and sterilizable plastic shoe, which essentially comprises an optionally heatable and/or coolable mould or injection mould with a bottom-half mould, a movable top-half mould and an optionally movable, correspondingly adapted last. The apparatus according to the invention is characterized in that in the bottom-half mould pins are provided, which are arranged and shaped in such a way that they form lateral ventilating openings on the shoe, whose outer boundary edges are lower than the corresponding inner boundary edges and which in the substantially vertical lateral area of the upper part of the shoe are spaced from one another over the outsole edge and that the last is optionally provided with corresponding recesses in which the pins can engage.

This apparatus is eminently suitable for producing a one-piece plastic shoe according to the invention, the pins provided in the bottom-half mould being shaped and arranged in such a way that on the one hand they reliably form the characteristic lateral ventilating openings in the shoe and on the other permit a rapid and substantially frictionless and removal of the shoe from the mould. According to a particularly preferred embodiment, the pins are arranged and shaped in such a way that they form lateral ventilating openings on the shoe and whose connecting sides between the outer boundary edges and the corresponding inner boundary edges form an angle between 0° and 30°, preferably between 5° and 15° with the normal line of the shoe positioned perpendicularly on the horizontal opening plane of the mould.

The pins provided in the bottom-half mould can have different configurations as a function of the different embodiments of the lateral ventilating openings. Thus, according to an advantageous embodiment, they are shaped in such a way that they form ventilating openings on the shoe, whose upper and lower outer boundary edges are located in one plane at right angles to the horizontal of the shoe. According to another preferred embodiment, the pins are shaped in such a way that they form ventilating openings on the shoe in which the upper outer boundary edge is located further outwards than the lower outer boundary edge. Finally, the pins can also be shaped in such a way that they form ventilating openings on the shoe, whose lower inner boundary edges are positioned further inwards than the corresponding upper inner boundary edges. In this embodiment, particularly effective ventilating openings are formed by the pins.

In the bottom-half mould, the pins can be arranged in one or more rows, so that in the substantially vertical lateral area, they form one or more rows of all-round ventilating openings, which start in the vicinity of the heel on one side of the shoe and end in the vicinity of the heel on the other side thereof and optionally the front shoe cap can be recessed.

If desired, the pins can have a different cross-sectional shape. Appropriately, these pins have a rectangular, square, circular or oval cross-section.

The construction and shape of the pins in the bottom-half mould considerably influence the quality of the ventilating openings in the shoe according to the invention. They also influence the possibility of removing the shoe from the mould. Independently of other configurations, preference is given to pins which taper conically towards the pin end, which considerably facilitates the removal from the mould of the hardened plastic shoe.

The invention is described in greater detail hereinafter relative to the drawings, which forms a part hereof and wherein:

FIG. 4 is another enlarged cutaway portion B from FIG. 2 with another embodiment of the ventilating openings according to the invention.

FIG. 5 is another enlarged cutaway portion B from FIG. 2 with a particularly preferred embodiment of the ventilating openings according to the invention.

FIG. 6 is a further embodiment of the shoe according to the invention with additional ventilating openings on the horizontal surface of the front part of the shoe.

Figure 1:
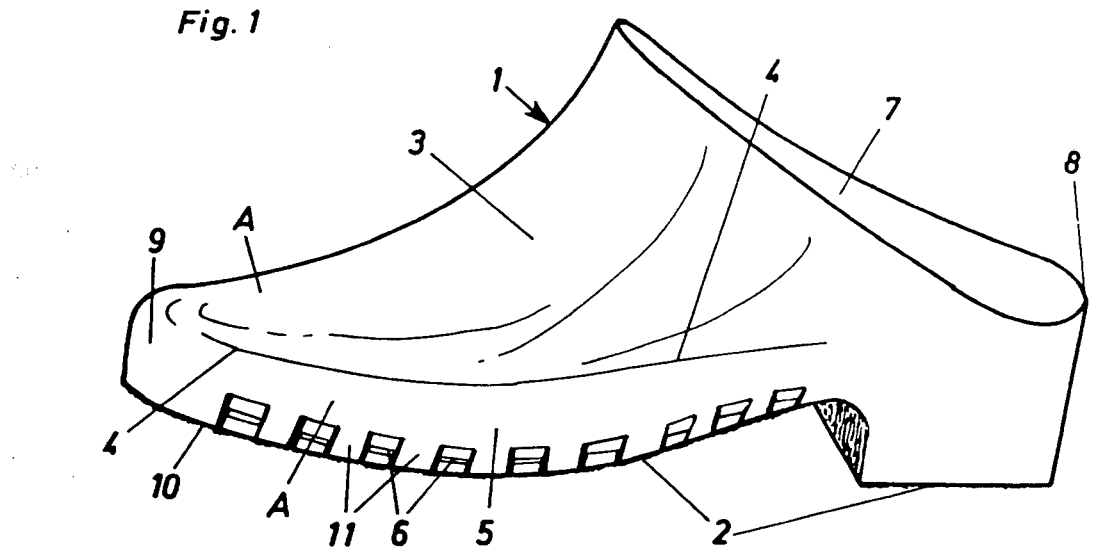
FIG. 1 is a perspective view of an embodiment of a shoe according to the invention.

In FIG. 1, the complete shoe according to the invention is designated 1, its lower part 2 and its upper part 3. The substantially vertical side area 5 of the upper part 3 in which the ventilating openings 6 according to the invention are provided is bounded approximately by the line 4 and also be the outsole edge 10.

In the represented embodiment, the outsole and heel are offset with respect to one another. Obviously, other embodiments are possible in which the outsole and heel extend into one another in a more or less definite manner. Upper part 3 is linked with lower part 2 and forms a cavity offering adequate space for the toes with the ball and metatarsus and which protectively surrounds them. The upper part terminates in an insertion opening 7 which leaves the heel free and which enables the foot to slip easily into and out of the shoe. If desired, the rear shoe cap 8, which is only intimated in the present embodiment, can be raised to such an extent that it surrounds and protects the heel, or other per se known supports can be provided for the heel.

Figure 2:
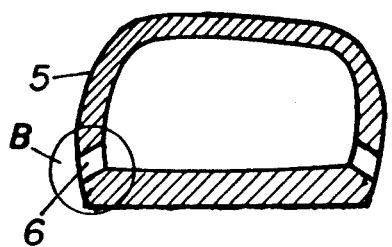
FIG. 2 is a cross-section through the front part of the shoe of FIG. 1 at the section line designated A—A.

In the case of the embodiment of FIG. 2, the ventilating openings 6 according to the invention in the upper part area 5 are arranged in given spacings in a row around the front part of the shoe, the row starting in the vicinity of the shoe heel and being interrupted in the vicinity of the front shoe cap 9. As is not apparent from FIG. 1, it is correspondingly continued on the other side of the shoe and terminates in the vicinity of the heel. Instead of a single row of ventilating openings, two or more such rows can be provided in the substantially vertical area 5 of the upper part. These rows are parallel to one another and the ventilating openings of adjacent rows are preferably displaced relative to one another, i.e. staggered. Obviously, ventilating openings can also be provided in the vicinity of the front shoe cap 9.

Webs 11, which connect the upper part 3 to the sole edge 10, are located between adjacent ventilating openings 6.

Figure 3:
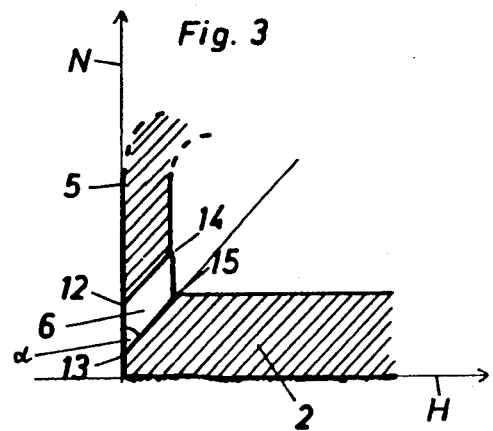
FIG. 3 is an enlarged cutaway portion B of FIG. 2 with a first embodiment of the ventilating openings according to the invention.

A section along the line A—A in FIG. 1 through the front part of the shoe is shown in FIG. 2. The cross-section shows the upper part 3 enveloping the front foot space with the laterally provided ventilating openings 6. FIG. 3 shows in detailed form how such a ventilating opening 6 is constructed in area B of FIG. 2. Ventilating opening 6 is located in the vertical side or lateral area 5 of upper part 3 and is bounded by outer boundary edges 12 and 13 and inner boundary edges 14 and 15. The outer boundary edges 12 and 13 are positioned lower than the corresponding inner boundary edges 14 and 15. As can be gathered from FIG. 3, the upper outer boundary edge 12 with the lower outer boundary edge 13 and the upper inner boundary edge 14 with the lower inner boundary edge 15 are respectively approximately in one plane N at right angles to the horizontal H. Hereinafter, this plane N is called the "shoe normal". The cross-section of FIG. 3 shows a constant diameter for ventilating opening 6. According to further developments of the invention, the ventilating openings can also preferably conically taper inwards.

FIG. 3 also shows that the connecting side located between the outer boundary edge 12 or 13 and the corresponding inner boundary edge 14 or 15 forms an angle α with the shoe normal N which is perpendicularly positioned on the horizontal plane H, which generally at the same time constitutes the opening plane for the mould. In order that the pins projecting into the moulded shoe and which form the lateral ventilating opening 6 do not prevent or make unnecessarily difficult the removal of the shoe from the mould, the angle α must be smaller than 90°. Mould removal takes place particularly simply and smoothly with an angle α of 0° to 30°, preferably 5° to 15°.

A further preferred embodiment of the ventilating openings is shown in FIG. 4. It differs from that of FIG. 3 by the position of the upper and lower boundary edges 12a, 14a and 13a, 15a with respect to one another. It is clear that the upper outer boundary edge 12a is located further outwards than the lower outer boundary edge 13a. As shown in FIG. 4, such a position is obtained if in the vicinity of the ventilating openings, side wall 5a bulges out in convex manner in the vicinity of the ventilating openings instead of being perpendicular to plane H. FIG. 4 also shows as a particularly preferred embodiment, a connecting side located between the lower boundary edges 13a and 15a which is positioned in such a way that it intersects the foot support surface 16 in the vicinity of ventilating opening 6a. This leads to a position in which the lower inner boundary edge 15a is positioned further inwards than the upper inner boundary edge 14a, so that when the shoe is being worn, ventilating opening 6a is partly located laterally under the foot. Ventilating openings in this position have proved to be particularly effective.

FIG. 5 shows another embodiment of the ventilating openings where, as in FIG. 4, the lower outer boundary edge 13b is located on the outsole edge 10, but the ventilating opening 6b tapers conically inwards from edges 12b and 13b to edges 14b and 15b.

As a result of the construction of the ventilating openings according to the invention and for which only a few preferred embodiments have been shown in exemplified manner in FIGS. 1 to 5, it is readily possible to remove the pins connected to the bottom-half mould from the ventilating openings after the injection moulded shoe has cooled. As a result of the construction and arrangement of the ventilating openings according to the invention, the outsole surface of the shoe is substantially not reduced. As is apparent from FIGS. 3 and 4, the construction of the ventilating openings according to the invention prevents e.g. liquid dropping from above onto the shoe from passing through openings into the interior of the shoe. Between in each case two adjacent ventilating openings, there is a web 11 (indicated by two solid lines in FIGS. 3 to 5) forming a connection between upper part 3 and sole edge 10.

FIG. 6 shows another embodiment of the shoe according to the invention in which additional circular ventilating openings are arranged in the form of rows on the substantially horizontal top area of the front upper part. An additional ventilating slot is provided in the front shoe cap approximately level with the ventilating openings provided on the sides according to the invention.

Figure 7:
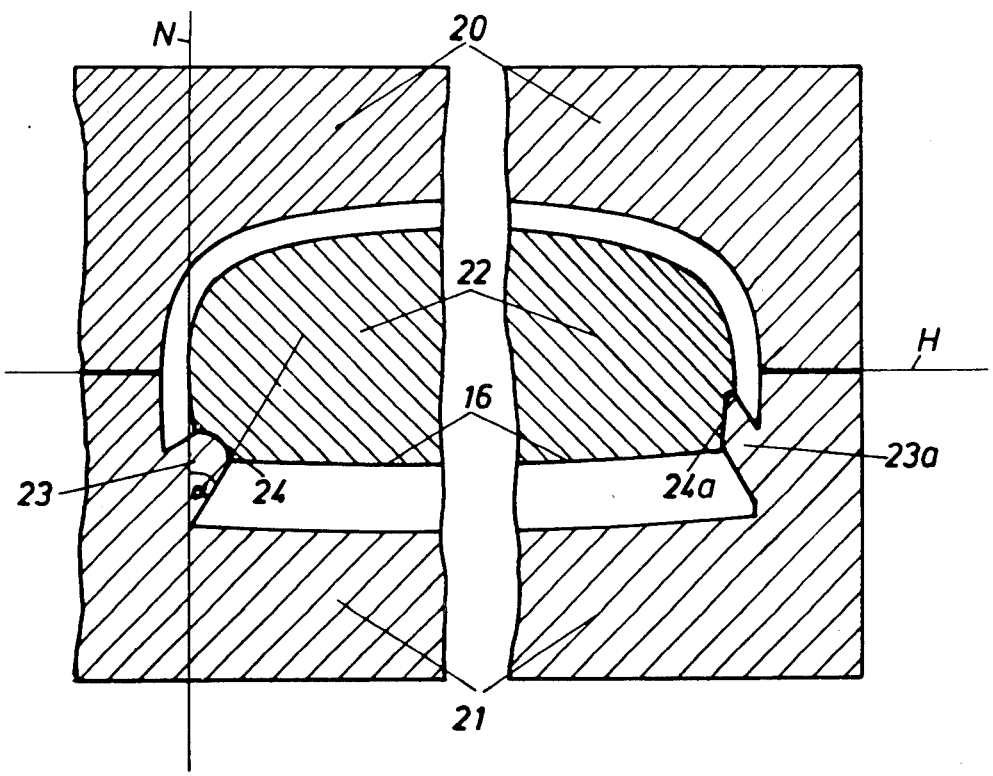
FIG. 7 is a cross-section through an apparatus according to the invention with top and bottom-half moulds with pins for the lateral ventilating openings and fitted last, the right-hand half of the drawing showing one embodiment and the left-hand half another embodiment.
Figure 8:
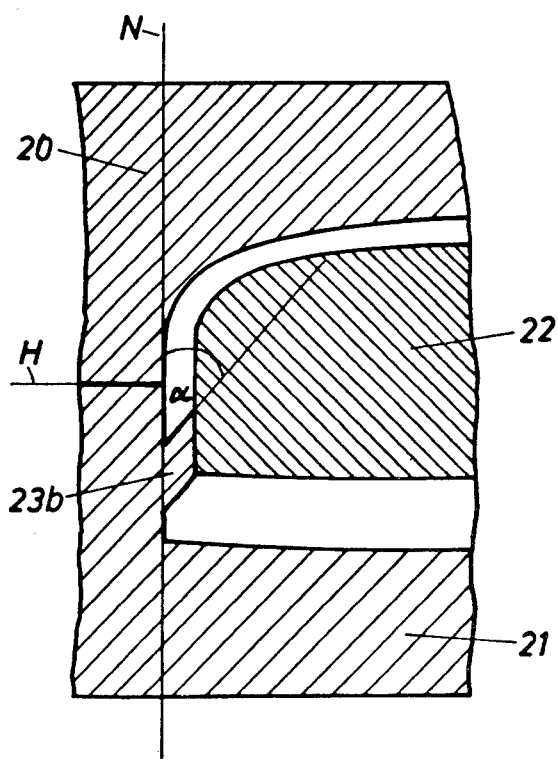
FIG. 8 is a cross-section through another embodiment of the apparatus according to the invention.

FIGS. 7 and 8 show apparatuses according to the invention for producing a plastic shoe with the characteristic lateral ventilating openings according to the invention in cross-sectional form. The apparatus comprises the top-half mould 20, the bottom-half mould 21 and last 22. Pins 23 are provided on the bottom-half mould 21 and form the lateral ventilating openings on the shoe. The left-hand half of FIG. 7 shows an embodiment in which pin 23 is constructed in such a way that it forms a ventilating opening whose upper outer boundary edge 12a, as seen in FIG. 4 is positioned further outwards than the lower outer boundary edge 13a located directly on the outsole edge 10. The connecting side between the lower outer and lower inner boundary edge intersects the edge of the foot support surface 16 in the vicinity of the ventilating opening, so that the latter projects to a small extent into the foot support surface. Last 22 is provided with a corresponding recess 24 in which engages pin 23. The cross-section also shows that pin 23 tapers towards the pin end, so that as a result ventilating openings are formed which taper conically from the outside to the inside.

The right-hand half of FIG. 7 shows a further embodiment in which pin 23a is constructed in such a way that it forms a ventilating opening in which the upper and lower outer boundary edges are in one plane at right angles to the horizontal opening plane H. The connecting sides are substantially parallel to one another, the lower outer boundary edge being positioned above the outsole edge. A recess 24a adapted to pin 23a is provided in lasts 22.

FIG. 8 shows another embodiment of the apparatus according to the invention in which the pin 23b is directly bounded by the plane passing through the inner boundary edges 14 and 15, so that last 22 has no recess for pin 23.

The embodiments of the invention described hereinbefore are intended to be of a non-limitative exemplified nature and obviously numerous variants are possible thereto which also utilize the inventive concept. Thus, for example, it is also possible to produce the lower part provided with the ventilating opening according to the invention, the outsole and the heel separately from the other part of the shoe. The upper part of the shoe can then also be from a different material to the lower part, e.g. a different plastic, leather, canvas, etc. The upper and lower parts are then interconnected at the same time as producing the lower part or after producing the latter. These and similar embodiments obviously fall within the scope of the invention.

As seen in FIG. 8, the top of the base of pin 23b on bottom-half mould 21 is lower than the top of the distal end of pin 23b in engagement with the last 22. Similarly, the bottom of the base of pin 23b on bottom-half mould 21 is lower than the bottom of the distal end of pin 23b in engagement with the last 22. In addition, the side walls of the pin 23b between the base and distal end of the pin forms an angle $\alpha$ which is less than 90° with the normal line N of the shoe, the normal line being perpendicular to the horizontal opening plane H of the mould. Advantageously, the angle $\alpha$ is between 0° and 30°, and preferably between 5° and 15°.

We claim:

1. A method for producing a one-piece, washable and sterilizable plastic shoe comprising the steps of:
   introducing a quantity of a mouldable plastic material, in a fluid state and at an appropriate temperature, into a mould comprising a top-half mould and a bottom-half mould with a correspondingly adapted last located therebetween to form an entire shoe,
   simultaneously forming lateral ventilating openings on the shoe being shaped in the last during the introducing step by suitably shaped and arranged pins extending between the last and the bottom-half mould, and
   after the plastic material has hardened, opening the mould and removing the entire one-piece plastic shoe therefrom.

2. A method according to claim 1, characterized in that the plastic material used is a polyurethane, the isocyanate component and the dihydroxy or polyhydroxy component being intensely mixed together in a suitable mixer just prior to the moulding of the shoe.

3. A method according to claim 2, characterized in that 0.1 to 0.4% by weight water, based on the quantity of the isocyanate-free component, is added as a foaming agent to said component.

4. A method according to claim 1, characterized in that an inert, low-boiling liquid is used as a foaming agent for the plastic material.

5. A method according to claim 1, characterized in that the shoe is moulded at a temperature between approximately 10° and 60° C.

6. A method according to claim 1, characterized in that the moulded shoe provided with lateral ventilating openings is removed from the mould in such a way that firstly the top-half mould is moved by a large distance and the last by a smaller distance in the upwards direction about a horizontal axis, the shoe being removed from the bottom-half mould with the pins for forming the lateral ventilating openings and is detached from the top-half mould, and that the shoe is subsequently removed from the last.

7. A method according to claim 1, wherein the plastic material is foamed plastic material.

8. A method according to claim 1, wherein the plastic material is foamed polyurethane.

9. A method according to claim 7, wherein the plastic material is foamed while the shoe is formed in the mould.

* * * * *